(12) United States Patent
Ortiz Garcia et al.

(10) Patent No.: US 12,213,495 B2
(45) Date of Patent: Feb. 4, 2025

(54) OLIVE OIL-BASED, SOLID VEGETABLE FATTY PRODUCT SUBSTITUTE FOR BUTTER OR MARGARINE AND USE THEREOF

(71) Applicant: HEALTHY FOOD IBERICA, S.L., Lepe (ES)

(72) Inventors: Juan Manuel Ortiz Garcia, Lepe (ES); Sergio Ortiz Garcia, Lepe (ES); Vidal Blanco Dominguez, Trigueros (ES)

(73) Assignee: HEALTHY FOOD IBERICA, S.L., Lepe (ES)

( * ) Notice: Subject to any disclaimer, the term of this patent is extended or adjusted under 35 U.S.C. 154(b) by 470 days.

(21) Appl. No.: 17/601,830

(22) PCT Filed: Mar. 25, 2020

(86) PCT No.: PCT/ES2020/070205
§ 371 (c)(1),
(2) Date: Oct. 6, 2021

(87) PCT Pub. No.: WO2020/212633
PCT Pub. Date: Oct. 22, 2020

(65) Prior Publication Data
US 2022/0183312 A1 Jun. 16, 2022

(30) Foreign Application Priority Data
Apr. 16, 2019 (ES) .................... 201930346

(51) Int. Cl.
*A23D 9/02* (2006.01)
*A21D 2/16* (2006.01)

(52) U.S. Cl.
CPC ............. *A23D 9/02* (2013.01); *A21D 2/16* (2013.01)

(58) Field of Classification Search
CPC .......... A23D 9/02; A23D 7/013; A23D 9/013; A23D 9/007; A23D 7/00; A23D 7/0053; A23D 7/0056; A23D 7/011; A23D 9/00; A23D 7/001; A21D 2/16; A21D 2/165; A21D 13/16; C11B 3/00; C11B 3/10
USPC ...... 426/556, 601–604, 606–607, 417, 330.6
See application file for complete search history.

(56) References Cited

U.S. PATENT DOCUMENTS

| | | | | |
|---|---|---|---|---|
| 5,560,950 A * | 10/1996 | Conte | ..................... | C11B 3/001 426/422 |
| 6,113,971 A * | 9/2000 | Elmaleh | ..................... | C11C 3/12 426/604 |
| 6,231,914 B1 * | 5/2001 | Huizinga | .............. | C11B 7/0083 426/607 |
| 2006/0153964 A1 * | 7/2006 | Repo | ..................... | C11B 5/0092 426/601 |
| 2009/0123619 A1 * | 5/2009 | Narine | ..................... | A21D 2/16 426/607 |
| 2010/0092617 A1 * | 4/2010 | Whittle | ..................... | A23L 29/10 426/549 |
| 2010/0291274 A1 * | 11/2010 | Shimizu | ................ | A23D 9/007 426/417 |
| 2011/0166224 A1 * | 7/2011 | Kishore | ................... | A23L 33/12 426/442 |
| 2011/0262599 A1 * | 10/2011 | Dilley | ..................... | A23G 9/48 426/607 |
| 2012/0053251 A1 | 3/2012 | Ervin et al. | | |
| 2012/0121786 A1 * | 5/2012 | Higgins | ................... | A23D 9/02 426/549 |
| 2012/0308708 A1 * | 12/2012 | Seibold | .................... | A23D 7/04 426/549 |
| 2013/0196045 A1 * | 8/2013 | Garcia Segovia | ..... | A23D 7/013 426/604 |
| 2015/0327565 A1 * | 11/2015 | Aldred | ................. | A23D 7/0056 426/438 |
| 2017/0354162 A1 * | 12/2017 | Baseeth | .................... | A21D 2/32 |
| 2018/0020689 A1 * | 1/2018 | Miret Carceller | ..... | A21D 2/188 426/549 |
| 2018/0295851 A1 * | 10/2018 | Pompili Ferrari | ...... | A23L 29/10 |

FOREIGN PATENT DOCUMENTS

| | | | | |
|---|---|---|---|---|
| CA | 3078101 A1 | 4/2019 | | |
| EP | 0792107 A1 | 9/1997 | | |
| EP | 2373176 B1 | 12/2011 | | |
| ES | 2595380 A1 * | 12/2016 | ............... | A23D 7/00 |
| ES | 2684102 A1 * | 10/2018 | ............... | A23D 7/00 |
| IT | 20090811 A1 | 4/2011 | | |
| KR | 20160051698 A * | 5/2016 | ............... | A23D 9/02 |
| WO | WO-2004017744 A1 * | 3/2004 | ........... | A23D 7/0056 |
| WO | 2017064737 A1 | 4/2017 | | |

OTHER PUBLICATIONS

International Search Report issued in PCT/ES2020/070205 mailed Jun. 19, 2020.
"Cocinar para dos", canal of Youtube.es [online]:"Mantequilla de Aceite de Oliva Virgen Extra": Dec. 16, 2013 [on line] [retrieved on Apr. 13, 2020]. Retrieved from Internet: https://www.youtube.com/watch?v=IxaNXiwRgJs, the whole video.

* cited by examiner (Continued)

*Primary Examiner* — Drew E Becker
*Assistant Examiner* — Luis Eugenio Diou Berdecia
(74) *Attorney, Agent, or Firm* — Heslin Rothenberg Farley & Mesiti P.C.

(57) ABSTRACT

The invention provides a solid vegetable fatty product the fundamental ingredient of which is olive oil, preferably extra virgin olive oil (EVOO), with the rest of the ingredients being deodorized cocoa butter, liquid sunflower lecithin, liquid microcrystalline cellulose, and where appropriate, stabilizer consisting of mono- and diglycerides of fatty acids of vegetable origin. Likewise, the invention relates to the use of the product in cooking and in manufacturing pastry and confectionery products as a substitute for butter and margarine.

3 Claims, No Drawings

OLIVE OIL-BASED, SOLID VEGETABLE FATTY PRODUCT SUBSTITUTE FOR BUTTER OR MARGARINE AND USE THEREOF

CROSS REFERENCE TO RELATED APPLICATIONS

This application is a U.S. National Phase filing under 35 U.S.C. § 371 of International Application PCT/ES2020/070205, filed Mar. 25, 2020, and published as WO 2020/212633 A1 on Oct. 22, 2020. PCT/ES2020/070205 claims priority from Spanish patent application number 201930346, filed Apr. 16, 2019. The entire contents of each of these prior applications are hereby incorporated herein by reference.

The present invention relates to a solid completely vegetable fatty product the fundamental ingredient of which is olive oil.

FIELD OF THE INVENTION

More specifically, the invention provides a solid completely vegetable fatty product for use as a substitute for conventional butter or margarine in pastry making and confectionery, wherein the olive oil constitutes between 68% and 75% by weight of the fatty product and is used as such, without having been subjected to any prior treatment process, such as hydrogenation.

The product of the present invention facilitates the incorporation of olive oil, and in a preferred embodiment extra virgin olive oil, in culinary techniques that, up until now, depended on and were created for butter and margarines, presenting obvious health-related benefits in cooking, pastry elaborations, catering, and industrial manufactures in which the use and standardization thereof has been proven to be extremely difficult up until now.

SUMMARY

In the present description, "extra virgin olive oil" is understood as a top-quality olive oil, such as the oily juice extracted from the fruit of an olive tree with perfect flavor and aroma characteristics, i.e., with zero median defects and an acidity less than or equal to 0.8°, which means that its maximum free acidity is 0.8 g per 100 g of oleic acid, as defined in Commission Regulation EU 2015/1830 of 8 Jul. 2015 amending Regulation (EEC) No 2568/91 on the characteristics of olive oil and olive-residue oil and on the relevant methods of analysis.

The beneficial effects of consuming olive oil, and particularly EVOO, on health, are well known. Likewise, this oil is held in high esteem in cooking due to its organoleptic characteristics. However, the use thereof for manufacturing industrial pastry and confectionery products is limited, mainly due to the fact that, like all vegetable oils, it is liquid at room temperature and the processes to give it a suitable consistency in these industries, such as hydrogenation, substantially reduce its beneficial properties and affect its organoleptic characteristics. This is the case, for example, of the product obtained by means of the method described in patents EP0792107 or U.S. Pat. No. 6,113,971A.

BACKGROUND

In this context, traditionally in the pastry making and confectionary industry, solid fats, i.e., butter or margarine, are fundamental ingredients. They therefore give a different flavor to the preparations in which natural flavors are used and absorbed, helping to evenly distribute aromas. They are also necessary to create thin and crispy fragments in laminated dough, such as croissants or puff pastries. In this case, when the dough is introduced in the oven, moisture in the fat is converted into vapor and carbon dioxide is released from yeast, causing the layers of dough to rise, the rise or the volume of the baked pastry is almost directly proportional to the percentage of solid fat. Likewise, the fat in milk from butter acts as a barrier to prevent moisture loss in finished baked goods.

In the case of butter and certain mixed margarines, their contents of animal fats make them unacceptable as vegetable products for producing vegan or vegetarian products in the pastry making and confectionary industry.

In turn, 100% vegetable margarine is often subjected to the hydrogenation process mentioned above so as to achieve the required semi-solid consistency. Moreover, the use of margarines in pastry making and confectionery is limited because the products obtained using same do not have the desired volume or texture.

Therefore, it would be desirable to have an olive oil-based fatty product of exclusively vegetable origin that will allow obtaining confectionery and pastry products which have a suitable texture and volume, can be readily handled at the application temperatures in these industries, and can be laminated extremely well.

The invention solves these problems of the state of the art by providing a vegetable fatty product of the type which has been described and which, in addition to being suitable for consumption by vegans or vegetarians, contains fewer calories and is healthier, has a high content of healthy fats, and is directly applicable in the pastry making and confectionery industries.

DETAILED DESCRIPTION

Therefore, according to a first aspect, the solid vegetable fatty product of the invention, the fundamental ingredient of which is olive oil, has the following composition, with the percentages expressed by weight with respect to 100 g of the end product:

| | |
|---|---|
| 68-75% | Olive oil with a free acidity less than or equal to 2 g/100 g of oleic acid, |
| 18-20% | Deodorized cocoa butter, |
| 3-4.7% | Liquid sunflower lecithin, E322, |
| 0.3% | Liquid microcrystalline cellulose, E460i, |
| 0-6% | Stabilizer consisting of mono- and diglycerides of fatty acids of vegetable origin. |

In a preferred embodiment, the olive oil is extra virgin olive oil (EVOO) with an acidity less than or equal to 0.8 g/100 g of oleic acid.

The cocoa butter present in the product of the invention allows increasing the melting point of the olive oil, whereas the sunflower lecithin helps to reinforce the emulsion by "positioning itself" between molecular bonds to increase their strength.

In turn, the microcrystalline cellulose works as a stabilizer and is purified cellulose that has been depolymerized, i.e., cellulose in which the molecular weight of the polymers has been reduced. It is an inert, colorless substance that does not cause toxicity in the amounts intended for use. Given that the human body does not digest microcrystalline cellulose, its incorporation in the product of the invention makes it easier to reduce its effective calorie contents and provides it with a source of insoluble dietary fiber.

The product of the invention includes from 0 to 6% by weight of mono- and diglycerides of fatty acids of vegetable origin. In a particular embodiment, especially for the application thereof for obtaining laminated products, such as puff pastries, the product of the invention includes up to 6% by weight of these stabilizers. In this specific case, this addition of mono- and diglycerides of fatty acids of vegetable origin increases the melting point of the fatty product and allows said fatty product to remain stable during the laminating process, in which heat is generated on the product when it is moved closer to the lamination rollers.

The process for obtaining the fatty product of the invention is described below.

First, the cocoa butter is melted and kept at 40° C., with the sunflower lecithin and the microcrystalline cellulose being added at this temperature and the mixture mechanically stirred, for example at 10,000 rpm, with a constant angular velocity, for 8 minutes, to complete a correct homogenization of the mixture.

Olive oil, necessarily filtered, is then added to the preceding mixture. In this regard, an oil the characteristics of which have not been altered and which has not been subjected to any treatment other than the washing, decantation, centrifugation, and filtration phase is used, and the mixture is emulsified. The mixture is then subjected to a step of cooling at 15° C., maintaining the stirring at a constant angular velocity of 10,000 rpm. This cooled mixture constitutes the product of the invention, which is packaged and stored at this temperature, without having to be kept in a cool place once the packaging is opened.

The obtained product provides different hints of flavor and aromas in comparison with butter or margarine, allowing the use of different varieties of olive oil, preferably extra virgin olive oil (Picual, Arbequina, Coupage, Lechin, etc.), providing a different acidity to the product, unlike a conventional butter or margarine product, which is sweeter.

Furthermore, the fatty product of the invention obtained, for example, by means of the method described above, has an application temperature of 4-18° C., being easier to handle at room temperature, and all the beneficial properties of extra virgin olive oil remain intact when said fatty product is applied to a dough to be baked, usually at a temperature in the order of 90-95° C., due to the cooking limit thereof being at temperatures in the order of 180° C.

In addition to the significant benefits resulting from the absence of allergens and from it having a completely vegetable origin, the product of the invention has an oilier and smoother texture, is easier to spread, and is especially suitable for very basic applications, such as for making cookies, sable biscuits, cakes, creams, or brioche, as well as in cooking applications, such as for making croquettes, sauces, béchamel, or pil-pil sauce, further being a fat that can be laminated extremely well.

Therefore, in a second aspect, the invention relates to the use of the product described above in cooking and in manufacturing pastry and confectionery products as a substitute for butter and margarine. In a particular embodiment, especially for the application thereof for obtaining laminated products, such as puff pastries, the product of the invention includes up to 3% by weight of mono- and diglycerides of fatty acids of vegetable origin as stabilizers.

EXAMPLES

1. Manufacturing Croissants
Ingredients:
225 g sugar
40 g salt
875 g 400 W flour
625 g 140 W flour
1050 g fatty product of the invention
500 g water
62.5 g fresh compressed yeast The yeast is dissolved in water at 38° C. and mixed with the 400 W flour using a hand mixer, keeping the dough at room temperature for 2 h until it triples in volume (sponge). This dough is kept in a refrigerator at 4° C. until the next day. Next, the rest of the flour, salt, sugar, 175 g of the product of the invention, and the sponge are kneaded, adding water little by little to obtain a firm dough. Kneading will be performed for about 10 minutes, and the final temperature of the dough must be between 23 and 25° C. until obtaining a sufficiently elastic dough. Next, dough pieces of 1500 g are weighed and left to rest for about 30 minutes covered with a plastic film. They are then stretched and cooled in a freezer until they reach 4° C.

The dough pieces are filled with the rest of the product of the invention, for which ester is previously softened at room temperature and envelops the dough, taking precaution to not pull the filling too much in order to prevent fat from coming out during stretching. After allowing the dough to rest for 15 minutes in the freezer and folding it once, it is again allowed to rest for one hour in the freezer and turned such that it is stretched in the direction opposite the earlier direction, the dough is again stretched and folded thrice, being left to rest again for one hour in the freezer, stretched, and cut. The filled dough pieces are cooled slightly before forming the pieces and fermentation takes place at 28° C. with a hydrometry of 55%. The mixture is colored with the help of a spray device for glazing baked goods before and after fermentation. Lastly, baking is carried out in a ventilated oven at 180° C. for 15 minutes.

The result is a very light and crispy croissant with the fat enveloping the mouth in a very smooth and pleasant manner and emanating a clean and fruity flavor of EVOO at the end, which takes a longer time to fade away. Since it has a lower melting point, the behavior of the croissant is much more predictable with the passage of time, such that the croissant behaves as if it were freshly baked several hours after baking.

2. Manufacturing Puff Pastries
Ingredients:
1000 g 280 W flour
500 g water
950 g of the fatty product of the invention
20 g salt
15 g vinegar The flour, salt, vinegar, 150 g of the fatty product of the invention, and water are kneaded for a time period of less than 10 minutes, where the dough must be half kneaded in order to finish refining it in the laminator. This dough is kept in the refrigerator for at least 2 hours wrapped in a plastic film to prevent it from drying. After this time, the dough is stretched and the rest of the product of the invention is placed in the center, being wrapped with the dough such that it is not overly pulled in order to prevent fat from coming out during stretching, it is punched, and slightly stretched, and left to cool for 15 minutes in a freezer. Lamination is then started, and three double folds are made, cooling the dough piece for 1 hour in a freezer wrapped with a plastic film between folds. Before baking the piece of puff pastry, it is important to allow it to rest for at least 4 hours.

Baking results in a very light and crispy puff pastry with the fat enveloping the mouth in a very smooth and pleasant manner and emanating a clean and fruity flavor of olive oil at the end, which takes a longer time to fade away. In the puff pastry, there is a greater sensation of the olive oil as it has a higher percentage of fat.

The invention claimed is:

1. A solid vegetable fatty product the fundamental ingredient of which is an olive oil, wherein the solid vegetable fatty product consists of the following composition, with the percentages expressed by weight with respect to 100 g of the solid vegetable fatty product:
- 68-75% olive oil with a free acidity less than or equal to 2 g/100 g of oleic acid,
- 18-20% deodorized cocoa butter,
- 3-4.7% liquid sunflower lecithin, E322,
- 0.3% liquid microcrystalline cellulose, E460i, and
- 0-6% stabilizer consisting of mon- and diglycerides of fatty acids of vegetable origin.

2. A solid vegetable fatty product according to claim 1, wherein the olive oil is an extra virgin olive oil, with an acidity less than or equal to 0.8 g/100 g of oleic acid.

3. A solid vegetable fatty product according to claim 1, wherein the solid vegetable fatty product has an application temperature in the range of 4-18° C.

* * * * *